United States Patent
McIntosh et al.

(10) Patent No.: US 7,444,626 B2
(45) Date of Patent: Oct. 28, 2008

(54) APPARATUS AND METHOD FOR LINEAR DEAD STORE ELIMINATION

(75) Inventors: Ronald Ian McIntosh, Scarborough (CA); Mark Peter Mendell, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 10/942,423

(22) Filed: Sep. 16, 2004

(65) Prior Publication Data

US 2006/0059476 A1    Mar. 16, 2006

(51) Int. Cl.
 G06F 9/45 (2006.01)
(52) U.S. Cl. ............... 717/151; 717/152; 717/154; 717/159; 717/155
(58) Field of Classification Search .......... 717/151, 717/152, 154, 159, 155; 707/206
See application file for complete search history.

(56) References Cited

U.S. PATENT DOCUMENTS

| | | | |
|---|---|---|---|
| 5,768,596 A * | 6/1998 | Chow et al. ............ 717/154 |
| 5,956,512 A * | 9/1999 | Simmons et al. ........ 717/154 |
| 5,999,736 A * | 12/1999 | Gupta et al. ............ 717/158 |
| 6,317,876 B1 * | 11/2001 | Kunz et al. ............. 717/154 |
| 6,609,249 B2 * | 8/2003 | Kunz et al. ............. 717/161 |
| 6,820,101 B2 * | 11/2004 | Wallman ................. 707/206 |
| 2002/0095669 A1 | 7/2002 | Archambault ........... 717/157 |
| 2005/0166194 A1 * | 7/2005 | Rubin et al. ............ 717/151 |

OTHER PUBLICATIONS

Knoop, et al. "Partial Dead Code Elimination", 1994, ACM, pp. 147-158.*
Bodik, et al. "Partial Dead Code Elimination using Slicing Transformations", 1997, ACM, pp. 159-170.*
Lo et al., "Register Promotion by Sparse Partial Redundancy Elimination of Loads and Stores", Silicon Graphics Computer Systems, Mountain View, CA, 1998 ACM, pp. 26-37.
Sastry et al., "A New Algorithm for Scalar Register Promotion Based on SSA Form", Performance Delivery Laboratory, Hewlett Packard Company, Cupertino, CA, 1998 ACM, pp. 15-25.
Kennedy et al., "Partial Redundancy Elimination in SSA Form", Silicon Graphics Computer Systems, (1999 ACM), ACM Transactions on Programming Languages and Systems pp. 1-50.

* cited by examiner

*Primary Examiner*—Wei Zhen
*Assistant Examiner*—Qamrun Nahar
(74) *Attorney, Agent, or Firm*—Duke W. Yee; Libby Z. Handelsman; James D. Skarsten (57) ABSTRACT

An apparatus and method for removing stores to local variables that are not aliased by other variables or to variables which have already been removed by previous optimizations prior to performing dead store elimination optimization are provided. With the method and apparatus, instructions that include a memory reference to a local variable that is not modified by other instructions are identified. For these instructions, an identifier of the variable referenced is maintained in a data structure along with the location of the store instruction in the procedure (for a store instruction) or a load indicator (for a load instruction). The data structure is then traversed to see if there are any store instructions referencing a variable that does not have a corresponding load instruction referencing the same variable. Such store instructions are eliminated prior to performing traditional dead store elimination.

18 Claims, 5 Drawing Sheets

```
int x;
void f() {
        int i;
        i = 1;          310
320 ─── x = i;
        x = i + 1;      330
}
```

FIG. 3B

```
int x;
void f() {
        int i;          310
        i = 1;
320 ─── x = 1;
        x = 2;          330
}
```

FIG. 3C

```
int x;
void f() {
    int i;
    i = 1;          /* removed by LDS */
    x = 1;          /* can be removed later by DSE */
    x = 2;          /* must stay */
}
```
310, 320, 330

FIG. 3D

```
int x;
void f() {
    int i;
    x = 2;    330
}
```

FIG. 4

APPARATUS AND METHOD FOR LINEAR DEAD STORE ELIMINATION

BACKGROUND OF THE INVENTION

1. Technical Field

The present invention is generally directed to an improved computer code optimization apparatus and method. More specifically, the present invention is directed to an apparatus and method for removing stores to local variables that are not aliased by other variables.

2. Description of Related Art

Dead store elimination (DSE) is a common optimization tool for compilers when compiling instructions. DSE is used to remove store instructions, or "stores," to memory that are no longer necessary. For example, compiler optimizations such as constant propagation, which propagates constant values forward in compiled code, often result in opportunities for store elimination. Such compiler optimizations permit the removal of code for such store operations if, after the constant propagation, the compiler can determine that the variable subject of the store operation is not subsequently used. Removing the code for such a store operation reduces execution path length in the compiled computer code.

While DSE is a useful optimization mechanism, it may greatly increase the compilation time for instructions. For example, the time it takes for DSE to optimize the instructions for a procedure is a function of the number of memory references in the procedure squared, i.e. $O(memoryReferences^2)$. In addition, the amount of memory space needed to perform the DSE operation for a procedure is also a function of the number of memory references in the procedure squared, i.e. $O(memoryReferences^2)$.

For procedures with many memory references, the memory requirements can be too large to represent the entire procedure in the available memory. Therefore, DSE may not be able to run on some procedures in source code. This leads to longer execution paths and thus, longer execution times. In addition, the compile time spent performing DSE operations may amount to a large percentage of the compile time at high optimization levels.

Therefore, it would be beneficial to have an apparatus and method for improving upon DSE mechanisms so that the memory requirements and execution times for performing the DSE operations are reduced.

SUMMARY OF THE INVENTION

The present invention provides an apparatus and method for removing stores to local variables that are not aliased to other variables. With the method and apparatus of the present invention, the instructions in a procedure are walked through to determine, for each instruction, whether there is a memory reference to a local variable. If so, a determination is made as to whether or not the local variable is aliased with another variable, has its address taken by another instruction, or has been designated as a volatile variable.

If the variable does not fall within one of these types of variables, then if the instruction is a store instruction, an identifier of the variable referenced is maintained in a data structure along with the location of the store instruction in the procedure. If the instruction is a load instruction, an identifier of the variable is maintained in a data structure along with an indicator that a value for the variable has been loaded.

Once each instruction in the procedure is processed in the above manner, the data structure is traversed to see if there are any store instructions referencing a variable that does not have corresponding load instructions referencing the same variable. If there are any store instructions which do not have corresponding load instructions referring to the same variable, these store instructions are removed from the source code based on the location information maintained in the data structure. In this way, a linear time and linear memory mechanism is provided for pre-processing the source code for dead store elimination. Since many of the dead stores may be removed in this manner, the time and required memory resources needed for performing the DSE operation is reduced. As a result, the compilation time for compiling and optimizing the source code may be reduced. Also, if there is insufficient memory to run the full DSE, the present invention obtains some of the benefit for very little effort. Moreover, the present invention can be used by itself at low optimization levels where compile speed and memory usage are more important than maximum program speed.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a mechanism for pre-processing instructions to determine if there are stores to local variables that are not aliased or volatile which may be determined to be dead stores so that these stores may be removed from the instructions prior to performing traditional dead store elimination operations on the instructions. The present invention provides a linear dead store pre-processing operation that traverses the instructions to identify such stores and eliminate them from the instructions to thereby generate partially optimized instructions. Thereafter, traditional dead store elimination operations may be performed on the partially optimized instructions.

Thus, the preferred embodiment of the present invention is embodied in software that is executed by a computing device. More specifically, the present invention is implemented as part of an instruction compiler/optimizer that operates in a computer to optimize and compile instructions into an executable format. Therefore, in order to provide a background with regard to an exemplary computing device in which the present invention may be implemented, FIG. 1 is provided as an exemplary block diagram of such a computing device.

Figure 1:
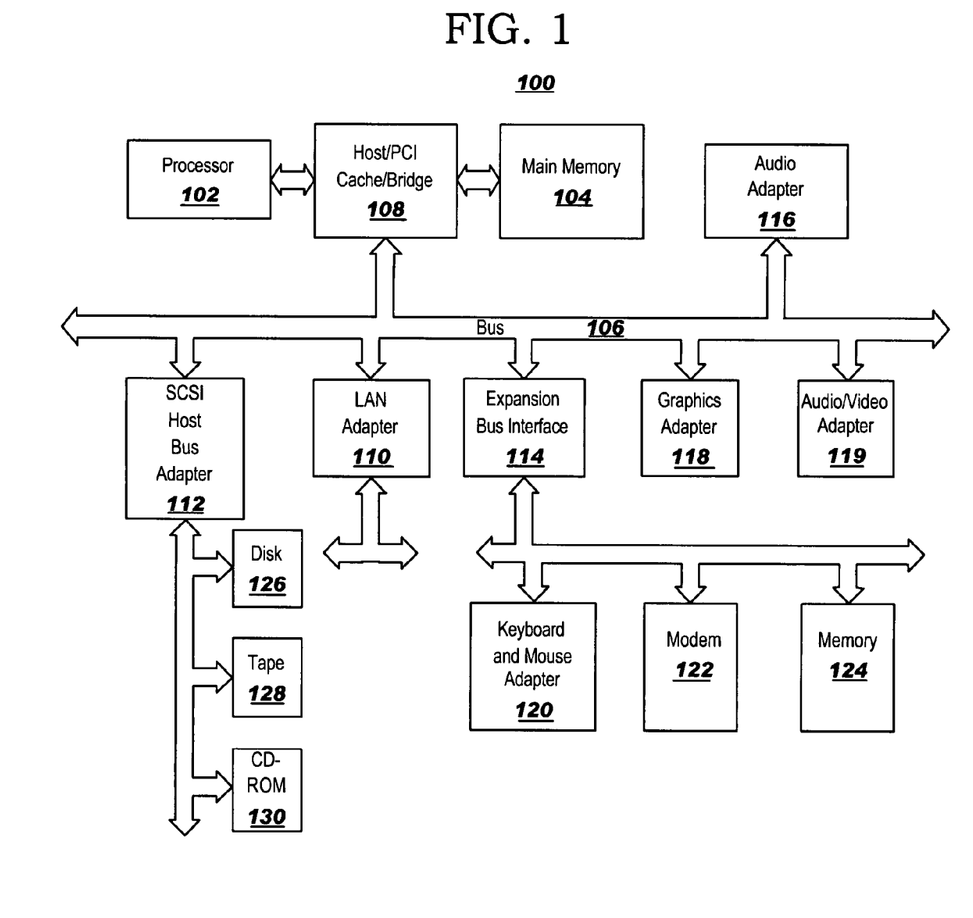
FIG. 1 is an exemplary block diagram of a data processing system in which the exemplary aspects of the present invention may be implemented.

With reference now to FIG. 1, a block diagram of a data processing system is shown in which the present invention may be implemented. Data processing system 100 is an example of a computer in which code or instructions implementing the processes of the present invention may be located. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in connectors. In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows® XP, which is available from Microsoft Corporation. An object oriented programming system such as Java may run in conjunction with the operating system and provides calls to the operating system from Java programs or applications executing on data processing system 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a personal digital assistant (PDA), which is configured with ROM and/or flash ROM to provide non-volatile memory for storing operating system files and/or user-generated data.

The depicted example in FIG. 1 and above-described examples are not meant to imply architectural limitations. For example, data processing system 100 also may be a notebook computer or hand held computer in addition to taking the form of a PDA. Data processing system 100 also may be a kiosk or a Web appliance.

The processes of the present invention are performed by processor 102 using computer implemented instructions, which may be located in a memory such as, for example, main memory 104, memory 124, or in one or more peripheral devices 126-130.

As mentioned above, the present invention provides an apparatus and method for removing stores to local variables that are not aliased by other variables. With the method and apparatus of the present invention, the instructions in a procedure are walked through to determine, for each instruction, whether it is a memory reference to a local variable. If so, a determination is made as to whether or not the local variable is aliased with another variable, has its address taken, or has been designated as a volatile variable.

If the variable does not fall within one of these types of variables, then if the instruction is a store instruction, an identifier of the variable referenced is maintained in a data structure along with the location of the store instruction in the procedure. If the instruction is a load instruction, an identifier of the variable is maintained in a data structure along with an indicator that a value for the variable has been loaded.

Once each instruction in the procedure is processed in the above manner, the data structure is traversed to see if there are any store instructions referencing a variable that do not have corresponding load instructions referencing the same variable. If there are any store instructions which do not have corresponding load instructions referring to the same variable, these store instructions are removed from the instructions based on the location information maintained in the data structure. In this way, a linear space and time mechanism is provided for pre-processing the instructions for dead store elimination. Since many of the dead stores may be removed in this manner, the time and required memory resources needed for performing the DSE operation is reduced. As a result, the compilation time for compiling and optimizing the instructions may be reduced. In fact, DSE may be executed several times as more opportunities are exposed. Linear Dead Store Elimination in accordance with the present invention may only need to be run before the first DSE operation is performed, since, depending on other optimizations performed, it may be unlikely to find any opportunities after the first execution.

Figure 2:
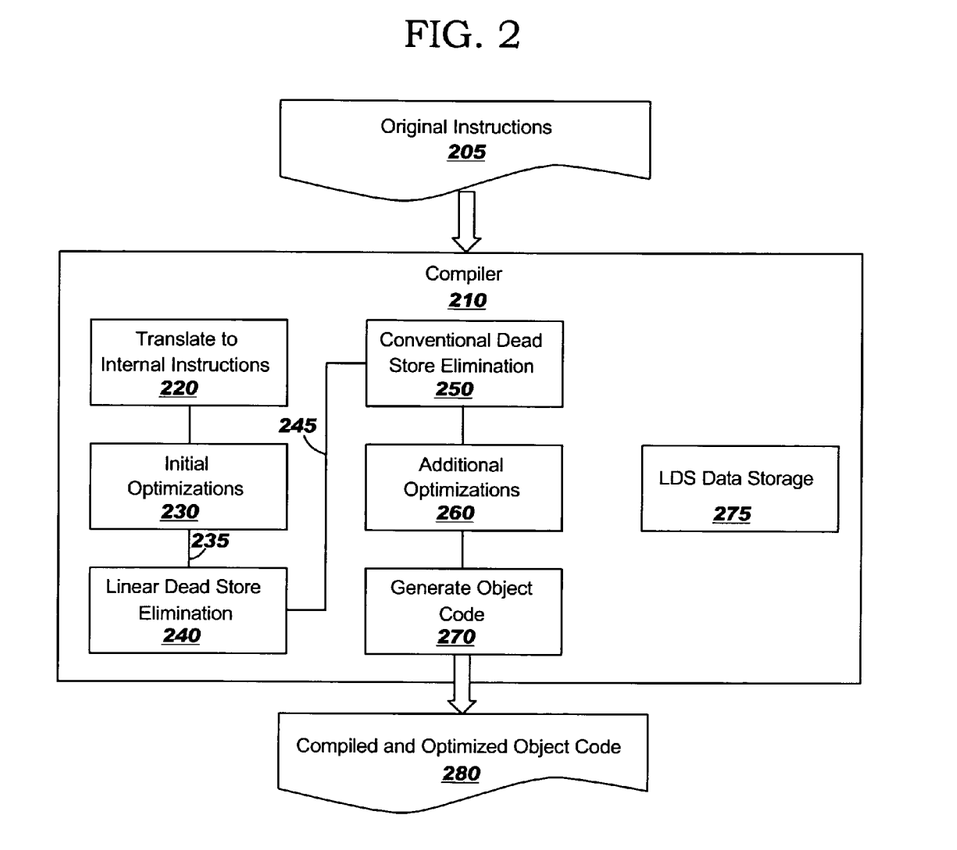
FIG. 2 is an exemplary block diagram of the primary operational components of one exemplary embodiment of the present invention.

FIG. 2 is an exemplary block diagram of the primary operational components of one exemplary embodiment of the present invention. As shown in FIG. 2, original instructions 205 are provided to a compiler/optimizer 210 which both optimizes and compiles the instructions into compiled and optimized object code 280. The compiled and optimized object code 280 may be executable object code that is optimized to remove dead stores in the instructions.

The compiler/optimizer 210 initially translates (220) the original source code instructions into an internal representation of the instructions for processing by the compiler/optimizer 210. Some initial optimizations on the translated internal instructions may then be performed (230), as is generally known in the art. Thereafter, linear dead store elimination is performed in accordance with the present invention.

The linear dead store elimination mechanism of the compiler/optimizer 210 operates on the initially optimized instructions 235 or alternatively the translated internal instructions if no initial optimizations are performed. The linear dead store elimination mechanism operates on these instructions 235 to perform a preliminary pass to remove dead stores associated with local variables that are not modified by more than one instruction, e.g., local variables that are not aliased by other variables, have their addresses taken by other instructions, or are volatile variables.

As part of the execution of the compiler/optimizer 210 on the original instructions 205 to translate the original instructions 205 into an internal representation of the instructions (220), the compiler/optimizer 210 obtains information about the various instructions and variables in the original instructions 205. For example, the compiler/optimizer 210 determines which variables are declared as local automatic variables, local static variables, what input parameters are passed to routines/methods of the original instructions 205, whether a variable is declared as being a volatile variable, etc. Moreover, the compiler maintains information about what addresses that are accessed by the original instructions 205 so that a determination may be made as to whether the same memory addresses are accessed by more than one variable, i.e. a variable is aliased with another variable, or whether the same address is taken by any instruction in the instructions 205.

An address being "taken" refers to the address of a variable being loaded or calculated by an instruction, so that it can be loaded or stored indirectly, as opposed to the value of the variable being directly loaded or stored. For example, [0] each reference to memory is associated with an identifier that represents the memory reference. This may be "i" for a load or store to local variable "i", or may be an identifier such as "pointer to int" representing the expression "*intPtr". For each identifier, the compiler keeps a data structure showing whether the address has been taken (such as "intptr=&i"), and also what possible aliases a reference may have (example *intptr may possibly change the value of "i".) This can be determined by noting which variables have had their address taken, and are of a "compatible" type. For example, a store to *intptr may alias with "i", but might not alias "double d", which has also had its address taken. The language semantics define this.

The present invention operates on the initially optimized instructions 235, or alternatively a translated version of the original instructions 205, and this information maintained or obtained by the compiler/optimizer 210 to determine which store instructions may be eliminated as local dead stores in a preliminary pass. Specifically, the linear dead store elimination mechanism walks the instructions and, for each instruction, determines if the instruction includes a memory reference to a local variable, e.g., a local automatic variable, a local static variable, an input parameter, or the like.

If the instruction includes a memory reference to a local variable, a determination is made as to whether the local variable is aliased with any other variable, has its address taken, or has been designated as a volatile variable. A "volatile" variable is one which has the language semantics such that a load or store may NOT be removed. A variable or memory reference is "aliased" with another variable or memory reference if an assignment to one might possibly change the "value" of the other one. If the local variable is not aliased with any other variable, does not have its address taken, and has not been designated as a volatile variable, a determination is made as to whether this instruction is a store instruction.

If the instruction is a store instruction, an identifier of the variable referenced by this instruction is stored in an entry in the linear dead store data structure storage 275. In addition, a location of the store instruction is associated with the entry in the linear dead store data structure storage 275.

If the instruction is a not a store instruction, a determination is made as to whether the instruction is a load instruction. If the instruction is a load instruction, an identifier of the variable referenced by the instruction is stored in an entry in the linear dead store data structure storage 275 along with an indicator identifying that the instruction was a load instruction.

An instruction may be simultaneously a load and a store (of the same variable or of different variables), or a load or a store and also take the address of a variable. Any instruction whose result depends on the value in a variable is considered as a load of that variable and any instruction which may change the value in a variable is considered a store into that variable.

If the instruction does not include a memory reference to a local variable, references a variable that is aliased by another variable, references a variable that has its address taken by another instruction, references a volatile variable, or is not a store or load instruction, then information about the instruction and the variable referenced are not stored in the linear dead store data structure storage 275.

This process is repeated for each instruction in the initially optimized internal version of the original instructions 235, or the internal representation of the original instructions 205 if no initial optimization is performed. When the linear dead store elimination mechanism finishes processing each instruction, the linear dead store data structure in the linear dead store data storage 275 is traversed to determine if there are any stores to a particular variable without a corresponding load instruction referencing the variable. If there is a store to the variable with no load of the variable, then the store instruction is determined to be a local dead store since the variable is not later used by another instruction. As a result, the store instruction may be eliminated from the instructions 235 in order to optimize the code by reducing the execution path of the instructions 235. These store instructions are deleted from the instructions 235 to generate partially optimized instructions 245.

The partially optimized instructions 245 are provided to a conventional dead store elimination mechanism 250 within the compiler/optimizer 210. The conventional dead store elimination mechanism 250 operates on the partially optimized instructions 245 to remove other dead stores in the partially optimized instructions 245. Because many of the dead stores have been eliminated through the use of the linear dead store elimination 240 to remove local dead stores in routines/methods of the instructions 235, the execution of the conventional dead store elimination mechanism 250 requires less memory space and less time to complete. The result is the optimized instructions 255 in which dead stores have been eliminated. These optimized instructions 255 may then undergo further optimizations 260 prior to being used to generate object code 270 for the original instructions 205. Once the object code is generated by the compiler/optimizer 210, the compiled and optimized object code 280 is output.

Figure 3A:
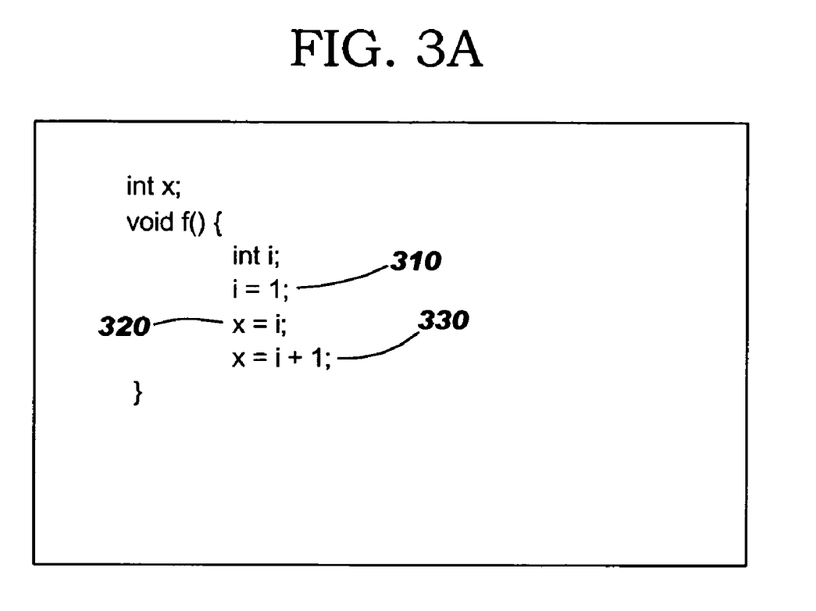
FIG. 3A is an exemplary diagram illustrating a small portion of instructions on which an exemplary embodiment of the present invention may operate.

FIG. 3A is an exemplary diagram illustrating a small portion of instructions on which an exemplary embodiment of the present invention may operate. As shown in FIG. 3A, the instructions include a declaration of the local variable i as an integer, the setting of i to the value 1, the setting of a second global variable x to the value of I, and the setting of x to the value "i+1." In an initial optimization of the instructions shown in FIG. 3A, the value for i will be propagated through each of the instructions such that the intermediate, or initially optimized instructions, are as shown in FIG. 3B.

Figure 3B:
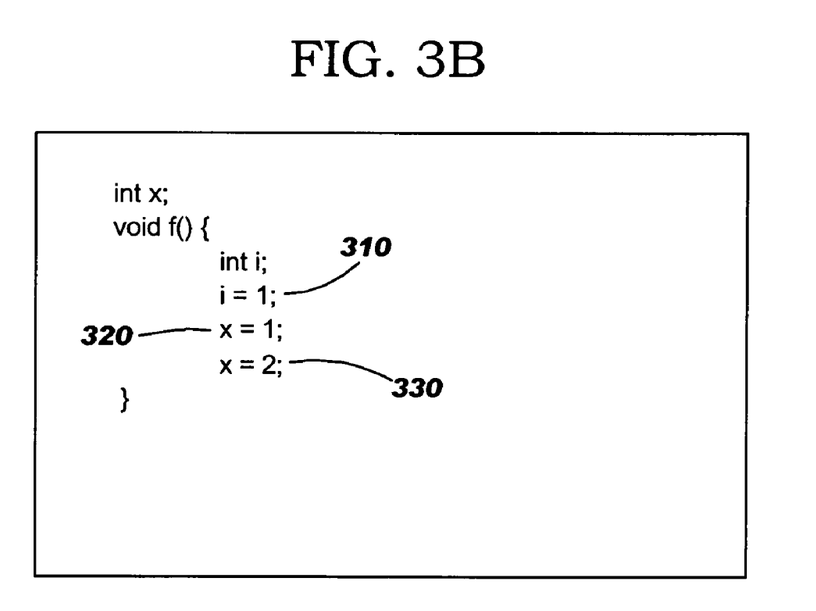
FIG. 3B is an exemplary diagram illustrating an initially optimized version of the small portion of instructions shown in FIG. 3A.

As shown in FIG. 3B, the initially optimized instructions include a declaration of the local variable i as an integer, the setting of i to the value of 1, the setting of x to the value 1, and the setting of x to the value of 2. It is upon this initially optimized set of instructions that the linear dead store elimination mechanism of the present invention operates.

The instruction 310 setting the variable i to a value of 1 is a dead store since the variable i is not referenced again in the set of instructions. The instruction 320 is also a dead store since the value of x is immediately reset to a different value by instruction 330 without the variable x being referenced by another instruction prior to its value being reset. However, only instruction 310 will be removed by way of the linear dead store elimination mechanism of the present invention since the variable x is a global variable. The first linear dead store 310 is removed from the instructions by the present invention because the variable i is a local variable and is not aliased by another variable, does not have its address taken, and is not declared as being volatile.

Figure 3C:
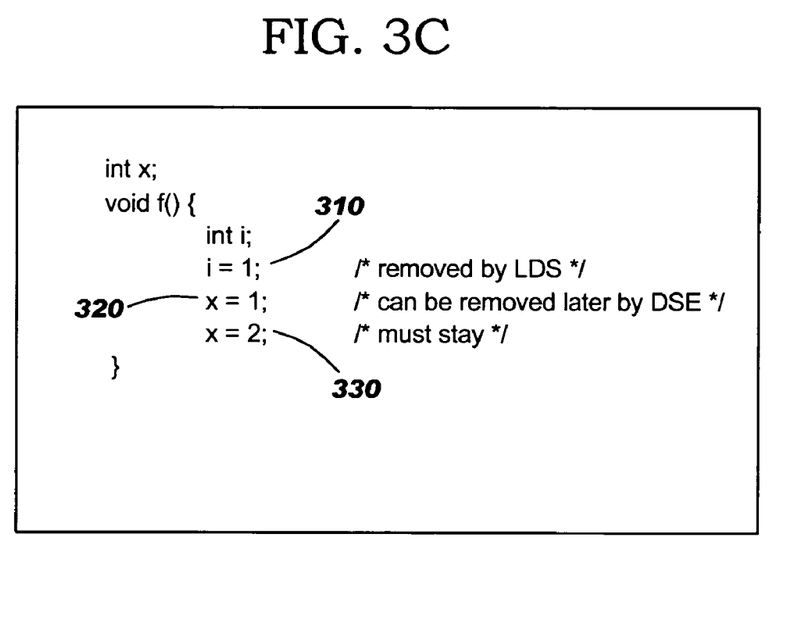
FIG. 3C is an exemplary diagram illustrating the same small portion of instructions from FIG. 3B with comments showing detailing the affect of the operation of the exemplary embodiment of the present invention.
Figure 3D:
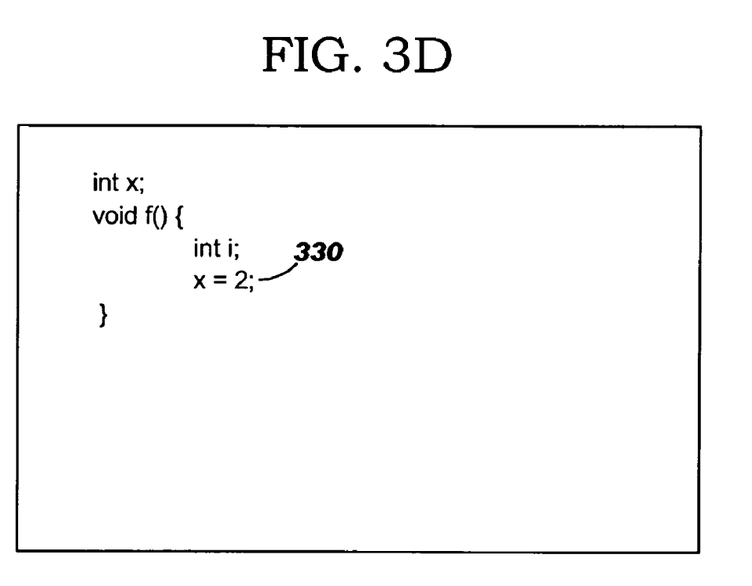
FIG. 3D is an exemplary diagram illustrating the same small portion of instructions from FIG. 3A after the operation of the exemplary embodiment of the present invention and conventional dead store elimination.

As shown in FIG. 3C, the first instruction 310 is eliminated by the linear dead store elimination mechanism of the present invention. As a result, the set of instructions will include only instructions 320 and 330. Thereafter, conventional dead store elimination may be used to remove instruction 320 since the value of x is immediately changed by instruction 330. As a result, the optimized set of instructions generated by using both linear dead store elimination and conventional dead store elimination will comprise only instruction 330 as shown in FIG. 3D.

Thus, with the use of the present invention, the amount of memory space and execution time of the conventional dead store elimination is reduced because the conventional dead store elimination does not need to handle the first local dead store 310 which has already been removed. While this is a simple example, with more complex sets of instructions where the number of local dead stores removed by the present invention is greater, the amount of improvement in the operation of the traditional dead store elimination because of the use of the present invention is more evident.

Figure 4:
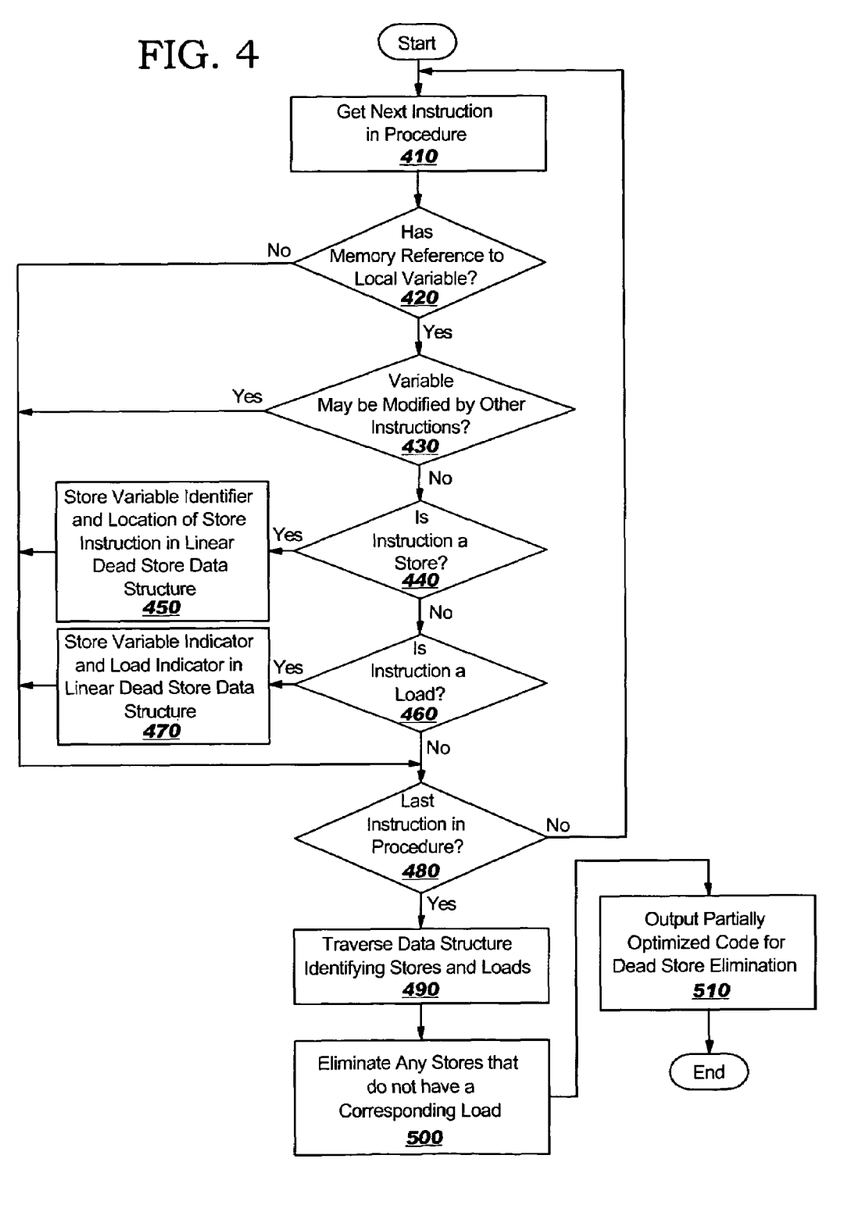
FIG. 4 is a flowchart outlining an exemplary operation of one exemplary embodiment of the present invention.

FIG. 4 is a flowchart outlining an exemplary operation according to the invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 4, the operation starts by obtaining the next instruction in a procedure, where the procedure is either an initially optimized internal representation of received instructions or simply an internal representation of received instructions (step 410). A determination is made as to whether the instruction has a memory reference to a local variable (step 420). This determination may include, for example, determining whether the memory reference in the instruction is to a local automatic variable, local static variable, or to an input parameter of the procedure.

If the instruction has a memory reference to a local variable, a determination is made as to whether the variable may be modified by other instructions (step 430). This determination may include, for example, determining whether the variable is aliased with another variable, has its address taken by another instruction, or has been designated as a volatile variable.

If the local variable may not be modified by another instruction in the procedure, a determination is made as to whether the instruction is a store instruction (step 440). If so, a variable identifier, e.g., a variable name, address, or other type of identifier, is stored along with the location of the store instruction in the instructions, in a linear dead store data structure (step 450).

If the instruction is not a store instruction, a determination is made as to whether the instruction is a load instruction (step 460). If the instruction is a load instruction, then a variable identifier is stored in the linear dead store data structure along with an indicator identifying that there was a load of the variable (step 470).

Thereafter, or if the instruction does not have a memory reference to a local variable (step 420), the local variable may be modified by another instruction in the procedure (step 430), is not a store instruction (step 440) or a load instruction (step 460), after storing the variable identifier and the location of the store instruction (step 450), or after storing the variable identifier and a load identifier (step 470), a determination is made as to whether this is the last instruction in the procedure (step 480). If not, the operation returns to step 410 where the next instruction in the procedure is obtained.

If this was the last instruction in the procedure, the linear dead store data structure is traversed to identify stores to variables that do not have corresponding loads of those variables (step 490). Any stores that do not have a corresponding load are then eliminated from the instructions to generate partially optimized instructions (step 500). These partially optimized instructions are then output for use by a conventional dead store elimination mechanism to further optimize the instructions (step 510). The operation then terminates.

Thus, the present invention provides a mechanism for performing an initial pass on instructions to remove local dead stores. This initial pass on the instructions simplifies the set of instructions being input to a traditional dead store elimination engine so that the amount of memory resources required and the amount of time required by the dead store elimination engine to perform its operations is significantly reduced. As a result, optimization and compilation of instructions is made quicker and more efficient.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimizing instructions, comprising:
   receiving a set of instructions;
   performing linear dead store elimination on each instruction in the set of instructions to form partially optimized instructions, wherein the linear dead store elimination comprises:
      determining, for an instruction including a memory reference to a local variable, that the instruction is a dead store instruction with regard to the local variable; and
      writing a linear dead store elimination data structure entry into a linear dead store elimination data structure for the dead store instruction;
      traversing the linear dead store elimination data structure to identify linear dead store elimination data structure entries corresponding to store instructions that do not have matching linear dead store elimination data structure entries corresponding to load instructions; and
      removing the instructions from the set of instructions that have linear dead store elimination data structure entries corresponding to store instructions that do not have matching linear dead store elimination data structure entries corresponding to load instructions; and
   providing the partially optimized instructions to a conventional dead store elimination engine for performing traditional dead store elimination operations on the partially optimized instructions to generate optimized instructions.

2. The method of claim 1, wherein performing the linear dead store elimination on the instruction including the memory reference to the local variable further comprises:
   responsive to determining that the local variable is aliased with another variable, including the instruction in the set of instructions to form the partially optimized instructions.

3. The method of claim 1, wherein performing the linear dead store elimination on the instruction including the memory reference to the local variable further comprises:
   responsive to determining that an address of the local variable is taken by another instruction, including the instruction in the set of instructions to form the partially optimized instructions.

4. The method of claim 1, wherein performing the linear dead store elimination on the instruction including the memory reference to the local variable further comprises:
   responsive to determining that the local variable is designated as a volatile variable, including the instruction in the set of instructions to form the partially optimized instructions.

5. The method of claim 1, wherein the determining step further comprises:
   responsive to determining that the local variable referenced by the instruction is not aliased or not referenced by another instruction, writing the linear dead store elimination data structure entry into the linear dead store elimination data structure for the instruction.

6. The method of claim 5, wherein the linear dead store elimination data structure entry identifies the local variable or the memory reference in response to the instruction being a store instruction, and wherein the linear dead store elimination data structure entry identifies a location of the store instruction within the set of instructions.

7. The method of claim 5, wherein the linear dead store elimination data structure entry identifies the local variable or the memory reference in response to the instruction being a load instruction, and wherein the linear dead store elimination data structure entry identifies the instruction as a load instruction.

8. The method of claim 1, further comprising:
   generating optimized object code based on an operation of the conventional dead store elimination engine on the partially optimized instructions.

9. The method of claim 1, wherein the set of instructions is a compiler internal representation of source instructions that have been initially optimized.

10. A computer program product in a recordable-type medium for optimizing instructions, comprising:
    first instructions for receiving a set of instructions;
    second instructions for performing linear dead store elimination on each instruction in the set of instructions to form partially optimized instructions, wherein the second instructions for performing the linear dead store elimination comprises:
       third instructions for determining, for an instruction including a memory reference to a local variable, that the instruction is a dead store instruction with regard to the local variable; and
       fourth instructions for writing a linear dead store elimination data structure entry into a linear dead store elimination data structure for the dead store instruction;
       fifth instructions for traversing the linear dead store elimination data structure to identify linear dead store elimination data structure entries corresponding to store instructions that do not have matching linear dead store elimination data structure entries corresponding to load instructions; and sixth instructions for removing the instructions from the set of instructions that have linear dead store elimination data structure entries corresponding to store instructions that do not have matching linear dead store elimination data structure entries corresponding to load instructions; and seventh instructions for providing the partially optimized instructions to a conventional dead store elimination engine for performing traditional dead store elimination operations on the partially optimized instructions to generate optimized instructions.

11. The computer program product of claim 10, wherein the second instructions for performing the linear dead store elimination on the instruction including the memory reference to the local variable further comprises:

instructions for including the instruction in the set of instructions to form the partially optimized instructions in response to determining that the local variable is aliased with another variable.

12. The computer program product of claim 10, wherein the second instructions further comprises:

instructions for including the instruction in the set of instructions to form the partially optimized instructions in response to determining that an address of the local variable is taken by another instruction.

13. The computer program product of claim 10, wherein the second instructions further comprises:

instructions for including the instruction in the set of instructions to form the partially optimized instructions in response to determining that the local variable is designated as a volatile variable.

14. The computer program product of claim 10, wherein the third instructions further comprise:

instructions for writing the linear dead store elimination data structure entry into the linear dead store elimination data structure for the instruction in the set of instructions that references the local variable that is not aliased or referenced by another instruction and is either a store instruction or a load instruction in response to determining that the local variable referenced by the instruction is not aliased or not referenced by another instruction.

15. The computer program product of claim 14, wherein the linear dead store elimination data structure entry identifies the local variable or the memory reference in response to the instruction being a store instruction, and wherein the linear dead store elimination data structure entry identifies a location of the store instruction within the set of instructions.

16. The computer program product of claim 14, wherein the linear dead store elimination data structure entry identifies the local variable or the memory reference in response to the instruction being a load instruction, and wherein the linear dead store elimination data structure entry identifies the instruction as a load instruction.

17. The computer program product of claim 10, further comprising:

eighth instructions for generating optimized object code based on an operation of the conventional dead store elimination engine on the partially optimized instructions.

18. An apparatus for optimizing instructions, comprising:

means for receiving a set of instructions into memory;

means for performing linear dead store elimination on each instruction in the set of instructions to form partially optimized instructions, wherein the linear dead store elimination comprises:

means for determining, for an instruction including a memory reference to a local variable, that the instruction is a dead store instruction with regard to the local variable; and means for writing a linear dead store elimination data structure entry into a linear dead store elimination data structure for the dead store instruction;

means for traversing the linear dead store elimination data structure to identify linear dead store elimination data structure entries corresponding to store instructions that do not have matching linear dead store elimination data structure entries corresponding to load instructions; and means for removing the instructions from the set of instructions that have linear dead store elimination data structure entries corresponding to store instructions that do not have matching linear dead store elimination data structure entries corresponding to load instructions; and means for providing the partially optimized instructions to a conventional dead store elimination engine for performing traditional dead store elimination operations on the partially optimized instructions to generate optimized instructions.

* * * * *